United States Patent [19]

Takigawa et al.

[11] 4,122,879

[45] Oct. 31, 1978

[54] HEAVY DUTY PNEUMATIC RADIAL TIRE

[75] Inventors: Hiroyoshi Takigawa, Higashi-Murayama; Shigeo Watanabe, Kokubunji; Shigeta Aoki, Higashi-Murayama; Hiroshi Ogawa, Kodaira, all of Japan

[73] Assignee: Bridgestone Tire Company Limited, Tokyo, Japan

[21] Appl. No.: 777,875

[22] Filed: Mar. 15, 1977

[30] Foreign Application Priority Data

Mar. 24, 1976 [JP] Japan .................................. 51-32128

[51] Int. Cl.$^2$ ............................................ B60C 11/04
[52] U.S. Cl. ................................. 152/209 R; D12/147
[58] Field of Search .................. 152/209 R; D12/146, D12/147, 149

[56] References Cited

U.S. PATENT DOCUMENTS

| D. 185,896 | 8/1959 | Johnson | D12/147 |
|---|---|---|---|
| D. 236,454 | 8/1975 | Hammond | D12/147 |
| 3,645,314 | 2/1972 | Verdier | 152/209 R |
| 3,875,986 | 4/1975 | Boileau | 152/209 R |

*Primary Examiner*—Albert J. Makay
*Assistant Examiner*—Lawrence E. Williams
*Attorney, Agent, or Firm*—Sughrue, Rothwell, Mion, Zinn and Macpeak

[57] ABSTRACT

A heavy duty pneumatic radial tire having tread patterns divided into a central zone and peripheral zones by two main continuous zigzag grooves spaced apart a distance 25–38% of the overall width of the tread and having a main groove oblique or zigzag angle of 55–78° relative to a radial plane of the tire. Each of the peripheral zones is divided into the form of arrow feathers by traverse grooves having walls tilted through at least 20% of the depth of the traverse groove at an angle within 20–40° to a center line of the traverse groove. The ratio of total areas of the central zone to those of one of the peripheral zones is 1:1.0 to 1:1.5, and the ratio of the total areas of inner and outer peripheral blocks in the peripheral zones divided by a continuous zigzag groove substantially parallel with the main grooves is 1:1.5 to 1:2.5, thereby greatly mitigating ununiform wear at the shoulders of the tread, heal-and-tow wear between front and rear edges of blocks defined by the grooves in the pattern, and railway wear at the edges of the blocks in opposition to the grooves.

10 Claims, 7 Drawing Figures

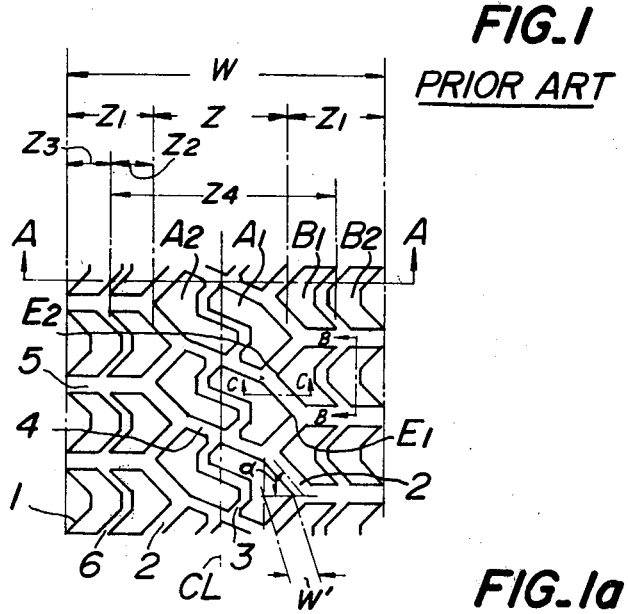
FIG._1 PRIOR ART
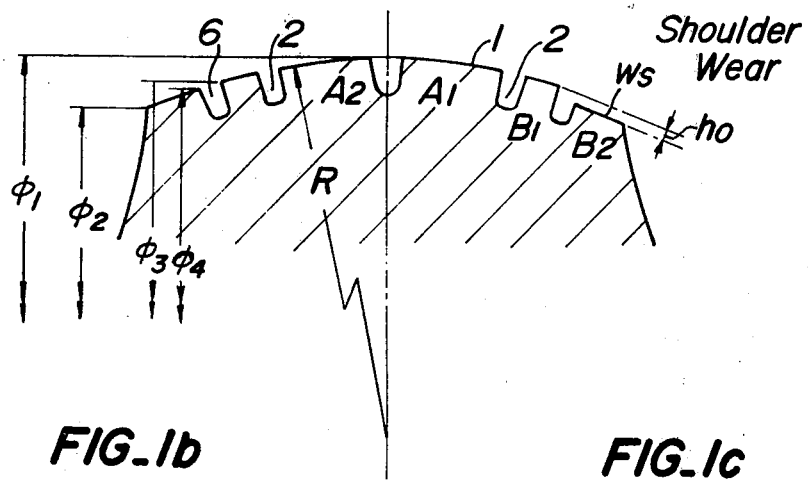
FIG._1a Shoulder Wear
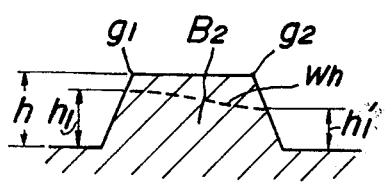
FIG._1b Heel-and-Toe Wear
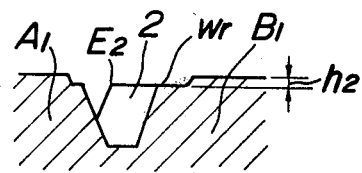
FIG._1c Railway Wear

HEAVY DUTY PNEUMATIC RADIAL TIRE

BACKGROUND OF THE INVENTION

(1) Field of the Invention

The present invention relates to heavy duty pneumatic radial tires for use in heavy vehicles such as trucks and buses, having tread patterns which are required for all-weather type tires for continuously travelling very long distances and which effectively reduce various kinds of uneven wear which is apt to occur in such tread patterned tires.

(2) Description of the Prior Art

In general, the heavy duty pneumatic radial tires having stiff reinforced layers such as metal cord layers are superior to the conventional bias tires in resistance to wear of treads, puncture and the like. In consequence of the remarkable improvement of highways, the demand for the heavy duty radial tires has been rapidly increased. On the other hand the performance of vehicles has been improved, so that travelling distances of vehicles or cars have been considerably spread in conjunction with the development of the highways. Accordingly, a new performance other than the above has been needed for these tires of this kind.

The new requirement for the tires is to have an all-weather property, that is, a performance capable of continuous travelling for a long period of time without being affected by all the conditions on roads (snowing, freezing, raining, flood, etc.) encountered during travelling long distances.

Performance of this kind generally depends upon the tread pattern. Block type tread patterns have been mainly developed for this purpose.

For the above purpose, however, there is a great difficulty with tires having block type tread patterns hitherto used, resulting from the fact that the continuous use of the tires for a long period of time causes extraordinarily irregular wear (ununiform or uneven wears) on the treads to shorten the life of the tires, because the tread patterns cannot endure severe conditions when travelling long distances for a long time, although they have been developed to fulfil the requirements for variations in weather conditions.

The above ununiform or uneven wears are generally classified into the following three kinds:

(1) Shoulders tend to wear more rapidly than crown centers of treads. Such a wear is referred to as "shoulder wear" and indicated by $W_s$ hereinafter.

(2) Rear edges of blocks in the patterns tend to wear to a greater extent than front edges which are brought into contact with a road surface earlier than the rear edges, to thus produce uneven wear of the blocks in the patterns. Such a wear is referred to as "heel-and-tow wear" and indicated by $W_h$.

(3) Edges of ribs or blocks in opposition to grooves extending in a circumferential direction of the tire tend to wear to form depressions along the grooves. This wear is referred to as "railway wear" and indicated by $W_r$.

SUMMARY OF THE INVENTION

It is an object of the invention to provide heavy duty pneumatic radial tires having improved block type tread patterns to eliminate the above ununiform or uneven wears in the tread of the tires.

A heavy duty pneumatic radial tire according to the invention includes an all-weather type tread pattern formed in a tread divided into a central zone and peripheral zones on both sides thereof by two main continuous, zigzag circumferential grooves formed on both sides of an equatorial line of the tire, said central zone comprising central blocks in two rows divided by segment grooves along said equatorial line and a number of dividing grooves extending between said main grooves to divide the central zone circumferentially. Each of said peripheral zones is circumferentially divided into blocks in the form of arrow feathers directed toward said equatorial line by traverse grooves communicated with said main groove at its extended portions opposite to said equatorial line, each of said peripheral zones being further divided by a continuous zigzag groove substantially circumferentially parallel to said main grooves into inner and outer peripheral blocks in two rows. The distance between said main grooves is 25–38% of the overall width of the tread, and oblique angle $\alpha$ of the zigzag of said main grooves is within 55°–78° relative to the axial direction of said tire. The of said traverse grooves defining said peripheral blocks into the form of feathers are tilted at an angle $\beta$ of 20°–40° to a center line of the traverse groove through a depth from the outer surfaces of said blocks of at least 20% of the depth of said traverse grooves, and the ratio of the total areas of said blocks in said central zone to those in one of said peripheral zones is 1:1.0 to 1:1.5 and the ratio of the total areas of said inner and outer peripheral blocks is 1:1.5 to 1:2.5.

BRIEF DESCRIPTION OF THE DRAWINGS

These and other objects, features and advantages of the invention will become more apparent upon a reading of the following detailed specification and drawings, in which:

FIG. 1 is a developed view showing a part of a tread pattern of a heavy duty pneumatic radial tire of the prior art;

FIG. 1a is a sectional view taken along the line A—A in FIG. 1;

FIG. 1b is a sectional view taken along the line B—B in FIG. 1;

FIG. 1c is a sectional view taken along the line C—C in FIG. 1;

DESCRIPTION OF THE PREFERRED EMBODIMENTS

Figure 2:
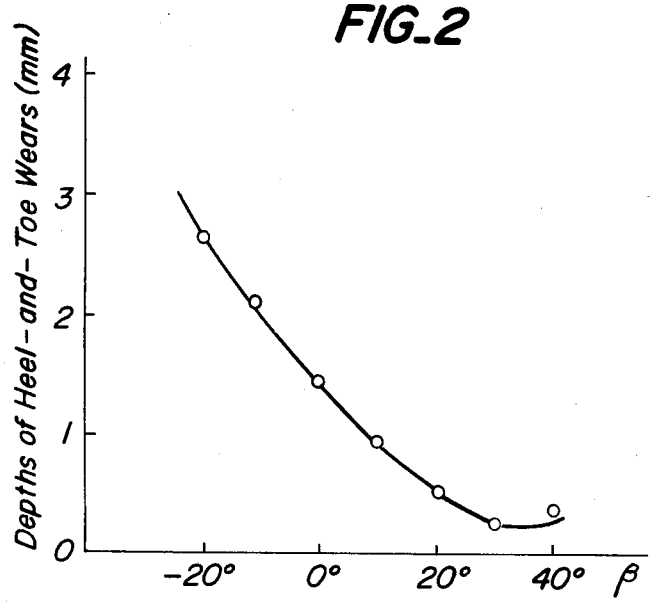
FIG. 2 is a graph showing the relation between the ununiform wear and the oblique angles $\beta$ of walls of the traverse grooves.

FIG. 1 is a developed view of a part of a tread of a prior art pneumatic radial tire having an all-weather tread pattern for heavy vehicles. Referring to FIG. 1a which is a sectional view taken along the line A—A in FIG. 1, the shoulder wear $W_s$ has progressed in a block $B_2$ adjacent to the ends of the tread to a greater extent than in block $B_1$ located inwardly adjacent thereto and in blocks $A_1$ and $A_2$ at the center of the tread, to thus produce a height difference $h_0$ between the blocks $B_1$ and $B_2$. FIG. 1b which is a sectional view of the tread taken along the line B—B in FIG. 1 illustrates the heel-and-toe wear $W_h$ caused by the fact that the rear edges $g_2$ of blocks in the pattern tend to wear to a greater extent than the front edges $g_1$ which are brought into contact with a road surface earlier than rear edges $g_2$ in a rotating direction of the tire, to thus produce a height difference $(h_1-h_1')$ between the front and rear edges of the block $B_2$ as shown in broken lines. FIG. 1c which is a sectional view of the tread taken along the line C—C in FIG. 1 illustrates the railway wear $W_r$ occurring in ridges $E_1$ and $E_2$ of the blocks $A_1$ and $B_1$ facing a main groove 2 therebetween, to thus produce a height difference $h_2$ having a width along the edges of the main groove 2.

These ununiform or uneven wears have been an important problem to be solved in tires of the prior art having all-weather type tread patterns separated by two continuous zigzag grooves 2, 2 circumferentially extending on both sides of an equatorial line CL into a central zone Z and a pair of peripheral zones $Z_1$, $Z_1$, the central zone Z including two series of blocks $A_1$ and $A_2$ divided by segment grooves 3 along the equatorial line CL and a number of dividing grooves 4 communicated with the main zigzag grooves 2, 2 and circumferentially dividing the central zone Z along the equatorial line CL. Each of the peripheral zones $Z_1$ includes the peripheral blocks $B_1$ and $B_2$ in inner and outer rows in the form of feathers of an arrow directed toward the equatorial line and defined by the main grooves 2 and traverse grooves 5 communicated with the main groove 2 at extended portions of the zigzag and circumferentially dividing the peripheral zone, the blocks $B_1$ and $B_2$ being divided by further continuous zigzag grooves 6 substantially parallel with the main groove 2.

The inventors of the present application have made a great number of experiments on the effects of the combination of the relatively wide main grooves 2, much narrower grooves 6, segment grooves 3, dividing grooves 4 and traverse grooves 5 for defining the respective blocks according to the above block patterns in order to improve the resistance to the ununiform or uneven wears after the continuous travel of the tires over a long distance for a long period of time and have arrived at the following conclusions based on the results of the experiments.

1. The shoulder wear mainly depends upon the rigidity distribution of the central zone Z and the peripheral zones $Z_1$ and $Z_1$ as determined by the locations of the grooves extending in a circumferential direction, particularly the main grooves 2 and the narrower zigzag grooves 6. In addition, the shoulder wear is affected by the curvature of the tread in cross-section which determines the difference $(\phi_1-\phi_2)$ between the maximum diameter of the tread (crown center diameter) and the minimum diameter of the tread (shoulder diameter), and particularly the difference $(\phi_3-\phi_4)$ between the blocks $B_1$ and $B_2$ divided by the zigzag grooves 6.

2. The heel-and-toe wear $W_h$ is severely affected by configurations of the grooves extending traversely in the pattern, particularly the traverse grooves 5 circumferentially defining the blocks in the peripheral zones and more particularly the angle of the walls of the grooves 5 relative to the equatorial line.

3. The railway wear $W_r$ is concerned mainly with the oblique angle and amplitude of the zigzag of the circumferential grooves, particularly the main zigzag grooves 2.

Figure 3:
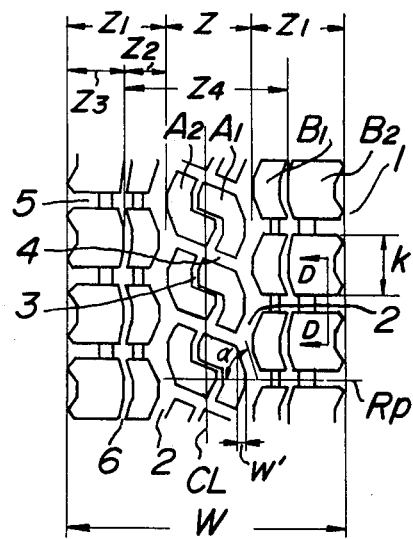
FIG. 3 is a developed view showing a part of a tread pattern according to the invention.

According to the invention, as shown in FIG. 3, the main grooves 2 dividing the tread 1 into the central zone Z and a pair of the peripheral zones $Z_1$ and $Z_1$ on both sides thereof consist of two continuous zigzag grooves in the circumferential direction of the tire having an oblique zigzag angle $\alpha$ of 55°–78°, preferably 60°–75°, to the radial plane $R_p$ including the axis of the tire and arranged in symmetry on both sides of the equatorial line CL, to thereby achieve a reduction of the railway wear. According to the invention, furthermore, the main grooves 2 are spaced from each other a distance of 25–38%, preferably 30–35%, of the overall width of the tread, and the zigzag grooves 6 are properly arranged and the crown radius of the tread 1 is suitably selected, so that the shoulder wear is substantially reduced. Moreover, the traverse grooves 5 dividing the blocks $Z_1$ into the shapes of feathers have upper oblique walls which extend to at least 20%, preferably more than 30%, of the depth of the grooves from the outer surface of the block, which oblique walls are tilted at an angle $\beta$ of 20°–40°, preferably 25°–35°, to the central axis $C_g$ of the section of the groove (FIG. 3a), which angle serves mainly to reduce the heel-and-toe wear.

According to the invention, furthermore, the main grooves 2 are so arranged that the ratio of the total area of the central zone Z to those of each of the peripheral zones $Z_1$ is 1:1.0 to 1:1.5, preferably 1:1.1 to 1:1.4, and the narrower zigzag grooves 6 are so arranged that the ratio of the total areas of the inner blocks $B_1$ to those of the outer blocks $B_2$ is 1:1.5 to 1:2.5, preferably 1:1.7 to 1:2.0. These arrangements of the main and narrower grooves 2 and 6 serve to reduce the shoulder wear, which is enhanced by the selection of the crown radius of the tread to within (2.5 to 3.5) × the width of the tread W, preferably (2.50 to 3.00) × W.

Furthermore, the narrower zigzag grooves 6 continuous in the circumferential direction substantially parallel to the main grooves 2 and dividing the peripheral blocks into the inner and outer rows should have a width narrower than 20–60% that of the main groove 2. The blocks in the peripheral zones should have circumferential lengths of 20–40% of the tread width W, preferably 25–35%.

The inventors of the present application have carefully studied the rigidity balance of the tread, that is, the relation between the central zone Z and the peripheral zones $Z_1$ and $Z_1$ on both sides thereof in order to reduce the shoulder wear. As the result the inventors have found that the rigidity in the central zone Z of tires in the prior art as shown in FIG. 1 is too high whereas the rigidity in the peripheral zones $Z_1$ is too low, and these unbalances in rigidity often cause shoulder wear. Further, it has been found with a great number of experiments that in order to prevent shoulder wear the best result can be obtained when the distance between the main grooves 2 defining the central zone Z is 25 to 38% of the overall width W of the tread 1. If the distance is less than 25% of the width W, the wear in the central zone Z increases rapidly, while if it is more than 38% of the width W, there is a tendency of the shoulder wear to increase as in the conventional tire.

Moreover, it has been found that in comparison of the total areas of the three zones (actual areas in contact with the road surface) divided by the area of the main grooves, if the total area of the central zone Z is less than 1:1.0 to 1:1.5 that of the peripheral zones $Z_1$, good shoulder wear resistance results. If the ratio is less than 1.0 the shoulder wear increases, while if the ratio is more than 1.5 the wear in the central zone tends to increase. In connection with the radii differences $\phi_1-\phi_2$ and $\phi_3-\phi_4$ as shown in FIG. 1a and the rigidity of the blocks in the peripheral zones $Z_1$, the narrower zigzag grooves 6 are arranged nearer to the shoulders than the main grooves 2 and divide the respective peripheral zones into two series of blocks $B_1$ and $B_2$ so that the total area of the inner blocks $B_1$ is less than that of the outer blocks $B_2$, the ratio of which total areas is preferably 1:1.5 to 1:2.5. When the ratio is less than 1.5 the shoulder wear increases, and if the ratio is more than 2.5 the rigidity of the inner blocks $B_1$ becomes extremely low, resulting in uneven wear. A crown at the outer surface of the tread 1 of 2.5 to 3.5 time the total width W of the tread effectively serves to reduce the shoulder wear. The lowest value of 2.5 is a lower limit for reducing the shoulder wear. The upper value of 3.5 is a limit for preventing failure in connection with the thickness of the tread rubber.

The heel-and-toe wear occurs in the blocks $B_1$ and $B_2$, as shown in FIG. 1b. It has also been found that the oblique angle $\beta$ of the walls of the traverse grooves 5 greatly affects the tendency of the heel-and-toe wear in the blocks $B_1$ and $B_2$.

FIG. 2 is a graph showing the relation between the oblique angle $\beta$ of the walls of the traverse grooves 5 on the abscissa and the height difference $(h_1-h_1')$ as shown in FIG. 1b on the ordinate. As can be seen from the graph, the best results can be obtained when the oblique angle $\beta$ is plus 20° to 40° relative to the central axis $C_g$ of the traverse groove 5. This means that when the oblique angle is within 20° to 40°, the outer surfaces of the blocks are most effectively restrained against movement when they are subjected to vertical loads. When the angle $\beta$ is other than 20° to 40°, it gives rise to increased heel-and-toe wear.

It is preferable to form the oblique walls extending from the bottom of the groove 5. In this case, however, the width of the groove 5 at the outer surface becomes larger which tends to reduce the road surface contact area. Accordingly, it is recommended that the depth of the oblique walls be more than 20% of total depth of the groove 5. If the depth of the oblique walls is less than 20%, the effect of the prevention of heel-and-toe wear may become small.

The railway wears occur mainly in the circumferential grooves, particularly the main grooves 2. It has been found with various experiments that although the amplitude $w'$ of the zigzag of the grooves 2 is preferably as small as possible, the best results can be obtained when the angle $\alpha$ of the main grooves 2 in the central zone Z is within 55° to 78° in consideration of the wear-resistant and wetting properties of the tire. It is also preferable to arrange the narrower zigzag grooves 6 in the peripheral zones $Z_1$ substantially parallel to the main grooves 2.

When the angle $\alpha$ is less than 55° there is a tendency of the railway wear to increase, whereas when the angle $\alpha$ is more than 78° the wear-resistant and wetting properties of the tires become weak.

An example of a tire according to the invention will be explained in detail hereinafter.

Radial tires of 10.00R20, 14P.R. having metal cord layers for reinforcing belts and rims of 7.50V × 20 were tested with an inner pressure of 7.25 kg/cm² and subjected to a load of 2.425 kg.

The tread patterns of the tires used were as shown in the developed view of FIG. 3. The radius of curvature of the outer surface of the tread 1 was 560 mm and the overall width W of the tread was 180 mm. The widths Z and $Z_1$ of the central and peripheral zones divided by the main zigzag grooves 2 were equally 60 mm. The ratio of the total areas of the central zone Z to one of the peripheral zones $Z_1$ was 1:1.25. The central zone Z was divided into pairs of blocks $A_1$ and $A_2$ by the segment grooves 3 and dividing grooves 4 extending between the main grooves 2. The peripheral zones $Z_1$ included many blocks defined by the traverse grooves 5 and main grooves 2 in the form of feathers of arrows, each of which was divided by the narrower grooves 6 into inner and outer blocks $B_1$ and $B_2$. The ratio of the outer surfaces of the blocks $B_1$ and $B_2$ was 1:1.85.

With this arrangement, the width $Z_4$ (FIG. 3) defined by the narrower zigzag grooves 6 was 60% of the overall width W of the tread.

Figure 3A:
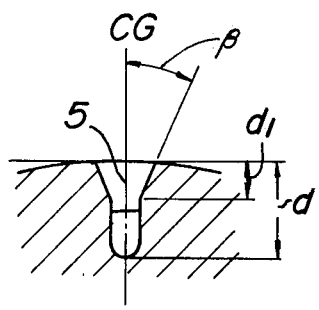
FIG. 3a is a sectional view taken along line D—D in FIG. 3.

Referring to FIG. 3a which is a sectional view of the tread taken along the line D—D in FIG. 3, the angle $\beta$ of the walls of the traverse groove 5 was 30° and the depth $d_1$ of the oblique walls was 25% of the depth $d$ of the groove 5.

The length of the blocks in the peripheral zones in the circumferential direction was 40 mm and the angle $\alpha$ of the main grooves was 68°. The amplitude $w'$ of the zigzag of the main grooves was 6.3 mm which was equal to that of the zigzag of the narrower grooves 6.

Table 1 illustrates the comparison between the ununiform or uneven wears of the conventional tires as shown in FIG. 1 and the improved tires according to the present invention used in an actual vehicle. These tires were used as front wheels and the wears were measured after travelling 40,000 km on a good paved road with 100% load.

Table 1

| Ununiform wear | Traveling speed: 40–80 km/hour | |
|---|---|---|
| | Tires in prior art | Tires according to the invention |
| 1 Shoulder wear ($h_o$ in FIG. 1a) | 3.8 mm | 1.9 mm |
| 2 Heel-and-toe wear ($h_1$-$h_1'$ in FIG. 1b) | 4.3 mm | 2.5 mm |
| 3 Railway wear ($h_2$ in FIG. 1c) | 2.0 mm | 0.4 mm |

The results in Table 1 indicate the remarkable improvement of the tire according to the invention.

What is claimed is:

1. In a heavy duty pneumatic radial tire having an all-weather type tread pattern formed in a tread divided into a central zone and peripheral zones on both sides thereof by two main, continuous, circumferential zigzag grooves formed on both sides of an equatorial line of the tire, said central zone comprising a plurality of central blocks disposed in two rows divided by segment grooves along said equatorial line and a number of dividing grooves extending between said main grooves, each of said peripheral zones being circumferentially divided into blocks in the form of arrow feathers directed toward said equatorial line by traverse grooves communicating with said main groove at extended portions thereof opposite said equatorial line, and each of said peripheral zones being further divided by a further continuous zigzag groove substantially circumferentially parallel with said main grooves into a plurality of inner and outer peripheral blocks disposed in two rows, the improvement comprising:
  (a) the distance between said main grooves being 25–38% of the overall width of the tread,
  (b) the oblique zigzag angle $\alpha$ of said main grooves being 55°–78° relative to the axial direction of said tire, (c) the walls of said traverse grooves being inclined at an angle β of 20°–40° relative to a cross-sectional center line of the traverse groove and extending to a depth from the outer surfaces of said blocks of at least 20% of the depth of said traverse grooves, (d) the ratio of total area of the blocks in said central zone to that in one of said peripheral zones being 1:1.0 to 1:1.5, and (e) the ratio of the total areas of said inner and outer peripheral blocks being 1:1.5 to 1:2.5.

2. A tire as set forth in claim 1, wherein said distance between said main grooves is 30–35% of said overall width of the tread.

3. A tire as set forth in claim 1, wherein said zigzag angle α of the main grooves is 60°–75°.

4. A tire as set forth in claim 1, wherein said angle β of the traverse grooves is 25°–35°.

5. A tire as set forth in claim 1, wherein the width of said further continuous zigzag groove is 20–60% that of said main grooves.

6. A tire as set forth in claim 1, wherein the circumferential lengths of said blocks in the peripheral zones are 20–40% of the width of the tread.

7. A tire as set forth in claim 1, wherein the circumferential lengths of said blocks in the peripheral zones are 25–35% of the width of the tread.

8. A tire as set forth in claim 1, wherein the crown radius of the tread is 2.5 to 3.5 times the width of the tread.

9. A tire as set forth in claim 1, wherein the ratio of the total area of said central zone to that of each of the peripheral zones is 1:1.1 to 1:1.4.

10. A tire as set forth in claim 1, wherein the ratio of the total area of said inner and outer peripheral blocks is 1:1.7 to 1:2.0.

* * * * *